United States Patent
Khan et al.

(10) Patent No.: US 10,067,741 B1
(45) Date of Patent: Sep. 4, 2018

(54) SYSTEMS AND METHODS FOR I/O DEVICE LOGGING

(71) Applicant: Amazon Technologies, Inc., Seattle, WA (US)

(72) Inventors: Asif Khan, Cedar Park, TX (US); Mark Bradley Davis, Austin, TX (US); Anthony Nicholas Liguori, Bainbridge Island, WA (US); David James Borland, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 652 days.

(21) Appl. No.: 14/562,556

(22) Filed: Dec. 5, 2014

(51) Int. Cl.
| | |
|---|---|
| *G06F 3/00* | (2006.01) |
| *G06F 5/00* | (2006.01) |
| *G06F 13/00* | (2006.01) |
| *G06F 13/36* | (2006.01) |
| *G06F 5/08* | (2006.01) |
| *G06F 5/14* | (2006.01) |
| *H04J 3/14* | (2006.01) |
| *H04L 12/861* | (2013.01) |

(52) U.S. Cl.
CPC .............. *G06F 5/085* (2013.01); *G06F 5/14* (2013.01); *G06F 13/00* (2013.01); *H04J 3/14* (2013.01); *H04L 49/90* (2013.01)

(58) Field of Classification Search
CPC .... G06F 13/28; G06F 2209/509; G06F 13/00; H04L 49/90; H04J 3/14
USPC .......................................................... 710/53
See application file for complete search history.

(56) References Cited

U.S. PATENT DOCUMENTS

| | | | |
|---|---|---|---|
| 7,334,178 B1 | 2/2008 | Aulagnier | |
| 7,583,596 B1* | 9/2009 | Frink ................... | H04L 12/5601 370/230.1 |
| 8,799,879 B2 | 8/2014 | Wright et al. | |
| 9,361,145 B1 | 6/2016 | Ganguly et al. | |
| 2003/0226058 A1* | 12/2003 | Miller ................. | G06F 11/1471 714/15 |
| 2006/0161707 A1* | 7/2006 | Davies ................ | G06F 11/2089 710/268 |

(Continued)

OTHER PUBLICATIONS

U.S. Appl. No. 14/562,560, filed Dec. 5, 2014, Titled: Virtual Machine Management Using I/O Device Logging.
(Continued)

*Primary Examiner* — Farley Abad
*Assistant Examiner* — Getente A Yimer
(74) *Attorney, Agent, or Firm* — Kilpatrick Townsend & Stockton LLP

(57) ABSTRACT

Techniques are described for logging communication traffic associated with one or more devices. For example, a system bus or other interface to a device may be monitored for traffic data elements. The traffic data elements may include, for example, transaction layer packets (TLPs) for communication across a PCI Express interface, or Ethernet packets for communication over a network. The traffic data elements can be processed by a classifier module and accordingly routed to one of a plurality of circular buffers. The circular buffers may maintain state (e.g., a head pointer and a tail pointer) that identify traffic data elements that are pending and those that are completed. Thus, the circular buffers can be inspected (such as after a crash) to determine recent activity.

22 Claims, 10 Drawing Sheets

(56) References Cited

U.S. PATENT DOCUMENTS

| | | | |
|---|---|---|---|
| 2008/0189720 A1* | 8/2008 | Moertl | G06F 13/102 719/314 |
| 2008/0228971 A1* | 9/2008 | Rothman | G06F 9/45558 710/104 |
| 2009/0327693 A1* | 12/2009 | Liang | H04L 49/90 713/150 |
| 2014/0052808 A1* | 2/2014 | Krishnan | H04L 67/40 709/212 |
| 2014/0129765 A1* | 5/2014 | Cho | G06F 11/1441 711/105 |
| 2014/0258570 A1 | 9/2014 | Eide et al. | |

OTHER PUBLICATIONS

Clark et al., "Live Migration of Virtual Machines", *NSDI 2005: 2nd Symposium on Networked Systems Design & Implementation* (2005), pp. 273-286.

Cully, et al. "Remus: Hight Availability via Asynchronous Virtual Machine Replication", Retrieved From the Internet <http://citeseerx.ist.psu.edu/viewdoc/download?doi=1 0.1.1.143.5802 &rep=rep1 &type=pdf>, 2008, pp. 161-174.

Huang et al., "High Performance Virtual Machine Migration with RDMA over Modern Interconnects", Retrieved From the Internet <http://ieeexplore.ieee.org/xpls/abs_all.jsp?arnumber=4629212 &tag=1 >, 2007, pp. 1-10.

\* cited by examiner

SYSTEMS AND METHODS FOR I/O DEVICE LOGGING

CROSS-REFERENCE TO RELATED APPLICATION

The present application is related to U.S. patent application Ser. No. 14/562,560, filed on Dec. 5, 2014, entitled "VIRTUAL MACHINE MANAGEMENT USING I/O DEVICE LOGGING", the entire contents of which are hereby incorporated by reference for all purposes.

BACKGROUND

Server computers often include one or more input/output (I/O) devices. For instance, a server computer may include one or more network interface controllers (NICs) and/or storage area network (SAN) adapters. Each I/O device may communicate over multiple, possibly asynchronous interfaces, such as PCI Express and Ethernet. For example, a processor may send packets over a PCI Express bus to a NIC, and the NIC may receive packets over an Ethernet cable for processing by the server.

However, in many cases, multiple I/O devices may share the same interface (e.g., a PCI Express bus). Furthermore, a single physical I/O device may present itself as multiple virtual devices (e.g., virtual functions), each of which may be accessed by multiple virtual machines running on a server. These factors can complicate the logging of data relating to the I/O devices.

BRIEF DESCRIPTION OF THE DRAWINGS

Various embodiments in accordance with the present disclosure will be described with reference to the drawings, in which.

DETAILED DESCRIPTION

Figure 1A:
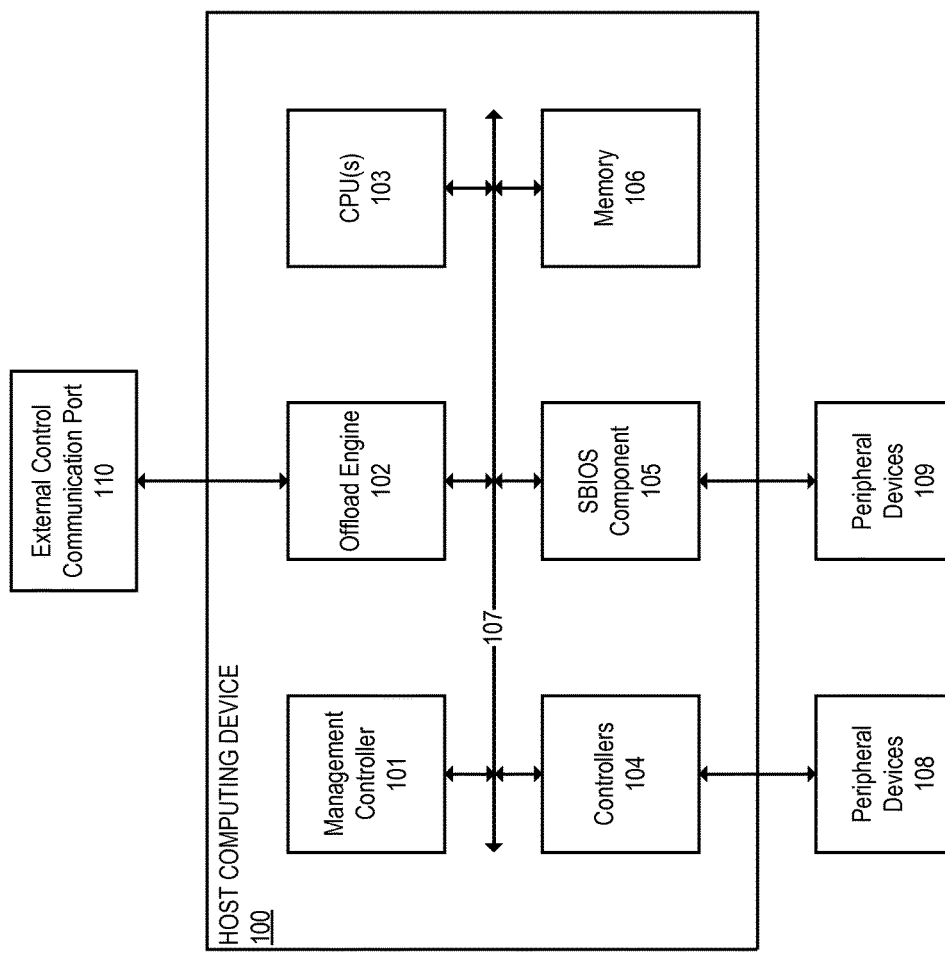
FIGS. 1A and 1B show, respectively, a host computing device including an offload engine according to one embodiment, and a block diagram illustrating the logging of communication between a CPU and an I/O device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are described for logging communication traffic associated with one or more devices. For example, a system bus or other interface to a device may be monitored for traffic data elements. The traffic data elements may include, for example, transaction layer packets (TLPs) for communication across a PCI Express interface, or Ethernet packets for communication over a network. The traffic data elements can be processed by a classifier module and accordingly routed to one of a plurality of circular buffers. The circular buffers may maintain state (e.g., a head pointer and a tail pointer) that identify traffic data elements that are pending and those that are completed. Thus, the circular buffers can be inspected (such as after a crash) to determine recent activity.

Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets. In other cases, I/O devices may be general purpose offloading engines or otherwise configurable. For example, an offloading engine may comprise a general purpose processor and firmware that may be used to support multiple functions, such multiple NICs and/or external processors.

It may be particularly useful to maintain a log of the activity of general purpose I/O devices such as an offloading engine. Such a log may be useful both to debug applications running on a server, and to troubleshoot the offloading engine.

However, there are many practical considerations that complicate the generation of such a log. Multiple I/O devices may often communicate over the same channel, such as a PCI Express bus. In addition, the same physical I/O device may present itself to the server as multiple virtual devices. For example, an offloading engine may use single root I/O virtualization (SR-IOV) to separate access to multiple functions implemented by the same physical device. These functions may be split, for instance, amongst multiple virtual machines running on a server. Furthermore, traffic data elements may be processed asynchronously, so that traffic data elements may be "completed" (e.g., acknowledged or otherwise processed) before previous traffic data elements.

Embodiments can address these issues by maintaining a plurality of circular buffers. Each circular buffer may be associated with one or more virtual or physical I/O devices. A classifier module can inspect a communication channel such as a system bus and route traffic data elements to an appropriate circular buffer. For example, if the traffic data element is an Ethernet packet, the classifier module may inspect a MAC address in the header to determine a NIC associated with the packet. Each circular buffer may maintain both a head pointer that points to the last element added and a tail pointer that points to the oldest pending traffic data element. A new traffic data element can be added to the buffer by adding the element at the head pointer and incrementing the head pointer by the size of the element. The tail pointer can be incremented, for example, once a traffic data element is no longer pending.

I. Systems

FIG. 1A shows a host computing device 100 including an offload engine 102 according to one embodiment. However, one skilled in the relevant art will appreciate that the disclosed illustrative components are not meant to be an exhaustive identification of all the components required by or present in a host computing device 100. Rather, illustrative components have been identified, in a non-limiting manner, to facilitate illustration of one or more aspects of the present application. Still further, the illustrative components of the host computing device 100 can be considered logical in nature such that the physical implementation of one or more components can be varied or such that one or more of the logical components may be implemented in a virtualized manner. Additionally, one or more host computing devices 100 can share one or more of the illustrated components, such as processors, graphical processing units, memory and the like.

In an illustrative embodiment, the host computing device 100 is associated with various hardware components, software components and respective configurations that facilitate the implementation of I/O device logging, which will be described in detail below. Specifically, in one embodiment, host computing device 100 can include a management controller 101 for managing the operation of host computing device 100 in accordance with the Intelligent Platform Management Interface ("IPMI"). Specifically, the management controller 101 can include an embedded microcontroller that manages the interface between system management software and host computing device 100 components.

In communication with the management controller 101 is an offload engine component 102. In one aspect, the offload engine component 102 can communicate as a standard bridge component for facilitating access between various physical and emulated components and a communication channel 107. In another aspect, the offload engine component 102 can include embedded microprocessors to allow the offload engine component to execute computer executable instructions related to the implementation of management functions or the management of one or more such management functions, or to execute other computer executable instructions related to the implementation of the offload engine component 102. In some embodiments, the offload engine component 102 may be implemented using multiple discrete hardware elements, such as multiple cards or other devices. The management controller 101 can be configured in such a way to be electrically isolated from any other component in the host computing device 100 other than the offload engine component 102.

Also in communication with the offload engine component 102 may be an external communication port component 110 for establishing communication channels between the host computing device 100 and one or more network based services or other computing devices. Illustratively, the external communication port component 110 can correspond to a network switch, sometimes known as a Top of Rack ("TOR") switch. The offload engine component 102 can utilize the external communication port component 110 to maintain communication channels between one or more services and the host computing device 100, such as health check services, financial services, and the like. Additionally, as will be described in greater detail below, data traffic between the offload engine component 102 and the external communication port component 109 can be logged.

The offload engine component 102 can also be in communication with a System Basic Input/Output System (SBIOS) component 105. The SBIOS component 105 can include non-transitory executable code, often referred to as firmware, that can be executed by one or more processors and used to cause components of the host computing device 100 to initialize and identify system devices such as the video display card, keyboard and mouse, hard disk drive, optical disc drive and other hardware. The SBIOS component 105 can also include or locate boot loader software that will be utilized to boot the host computing device 100. For example, in one embodiment, the SBIOS component 105 can include executable code that, when executed by a processor, causes the host computing device 100 to attempt to locate Preboot Execution Environment (PXE) boot software. Additionally, the SBIOS component 105 can include or takes the benefit of a hardware latch that is electrically controlled by the offload engine component 102. The hardware latch can restrict access to one or more aspects of the SBIOS component 105, such controlling modifications or configurations of the executable code maintained in the SBIOS component 105.

The SBIOS component 105 can be connected to (or in communication with) a number of additional computing device resources components, such as central processing units ("CPUs") 103, memory 106 (e.g., RAM), and the like. In one embodiment, such computing device resource components may be physical computing device resources in communication with other components via the communication channel 107. The communication channel 107 can correspond to one or more communication buses, such as a shared bus (e.g, a front side bus, a memory bus), a point-to-point bus such as a PCI or PCI Express bus, etc., in which the components of the bare metal hosting platform 200 communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host computing device 100. In such embodiments, the offload engine component 102 can implement a management process in which a host computing device is configured with physical or emulated hardware components based on a variety of criteria. The computing device resource components may be in communication with the offload engine component 102 via the communication channel 107. In addition, although communication channel 107 in FIG. 1A is shown as connecting all of components 101-106, it should be appreciated that a communication channel in accordance with some embodiments may connect any subset of the components 101-106 and/or other components. For example, a communication channel may connect a PCI Express device to a CPU via a northbridge or host bridge.

Also in communication with the offload engine component 102 via the communication channel 107 may be one or more controller components 104 for managing hard drives or other forms of memory. An example of a controller component 104 can be a SATA hard drive controller. Similar to the SBIOS component 105, the controller components 104 can include or take the benefit of a hardware latch that is electrically controlled by the offload engine component 102. The hardware latch can restrict access to one or more aspects of the controller component 104. Illustratively, the hardware latches may be controlled together or independently. For example, the offload engine component 102 may selectively close a hardware latch for one or more components based on a trust level associated with a particular customer. In another example, the offload engine component 102 may selectively close a hardware latch for one or more components based on a trust level associated with an author or distributor of the executable code to be executed by the offload engine component. In a further example, the offload engine component 102 may selectively close a hardware latch for one or more components based on a trust level associated with the component itself.

The host computing device 100 can also include additional components that are in communication with one or more of the illustrative components associated with the device 100. Such components can include devices, such as one or more controllers 104 in combination with one or more peripheral devices 108, such as hard disks or other storage devices. Additionally, the additional components of the host computing device 100 can include another set of peripheral devices 109, such as Graphics Processing Units ("GPUs"). The peripheral devices 108 and 109 can also be associated with hardware latches for restricting access to one or more aspects of the component. As mentioned above, in one embodiment, the hardware latches may be controlled together or independently.

Figure 1B:
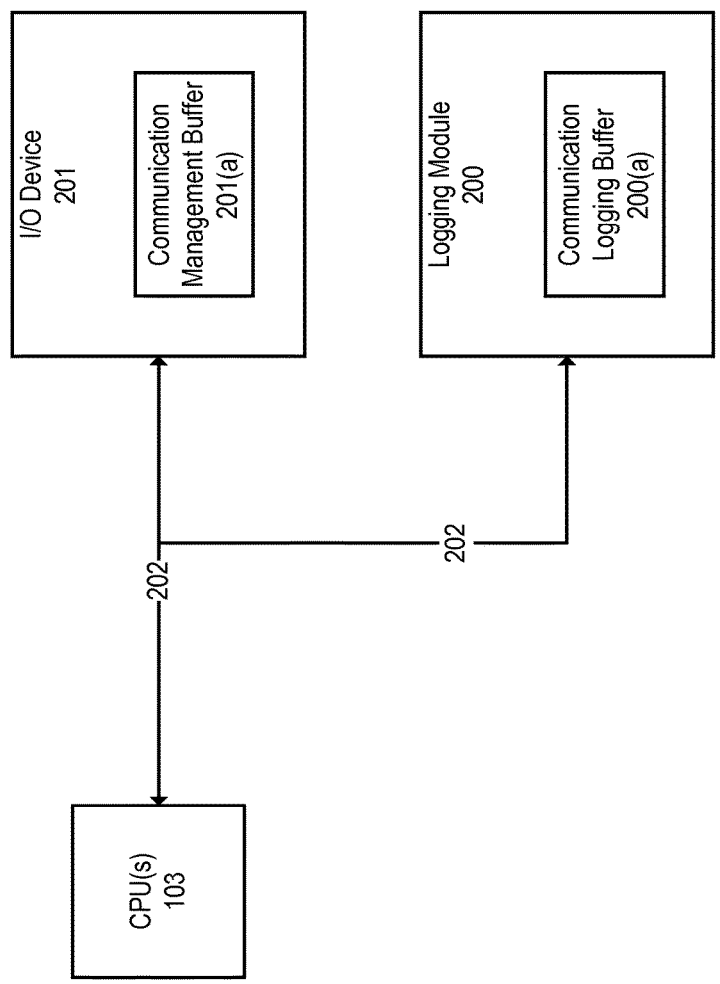

FIG. 1B shows a diagram illustrating communication between CPU(s) 103 and an I/O device 201, via a communication channel 202. The communication is logged by a logging module 200. In various embodiments, logging module 200 may be part of I/O device 101, may be (?) handled by CPU(s) 103, or may be implemented using separate hardware.

With reference to host computing device 100, examples of I/O devices 201 may include offload engine 102, controllers 104, peripheral devices 108-109, and devices connected to external control communication port 110. Generally, I/O device 201 may include any device that inputs and/or outputs data along the communication channel 202. Typically, I/O device 201 may comprise a communication management buffer 201(*a*) that may be used to manage communication between I/O device 201 and CPU(s) 103. For example, in some embodiments, I/O device 201 may use communication management buffer 201(*a*) to keep track of data sent and/or received by I/O device 201. In some embodiments, communication management buffer 201(*a*) may be a circular buffer.

Logging module 200 may be operable to log data traffic sent over a communication channel 202 between CPU(s) 103 and I/O device 201. For example, in some embodiments, the communication channel 202 may be similar to communication channel 107 of host computing device 100. For example, communication channel 202 may be a PCI Express bus, an Ethernet network, etc.

In some embodiments, logging module 200 may include a communication logging buffer 200(*a*) operable to capture and store traffic data elements sent via communication channel 202. A "traffic data element" may include any data or other information associated with communication traffic to, from, or inside an I/O device. Traffic data can include messages or other data passed along a communication medium such as communication channel 202. For example, if the communication medium is a PCI Express bus, the traffic data may include transaction layer packets sent across the bus. A traffic data element may be, for example, a single transaction layer packet. If the communication medium is an Ethernet network, the traffic data may include TCP or UDP packets sent across the network. A traffic data element may be, for example, an Ethernet packet such as a TCP/IP packet or a UDP packet. Traffic data elements may be of any suitable length. For example, the traffic data elements can be of fixed length (e.g., if there is a predefined packet size), or of variable length.

Figure 4:
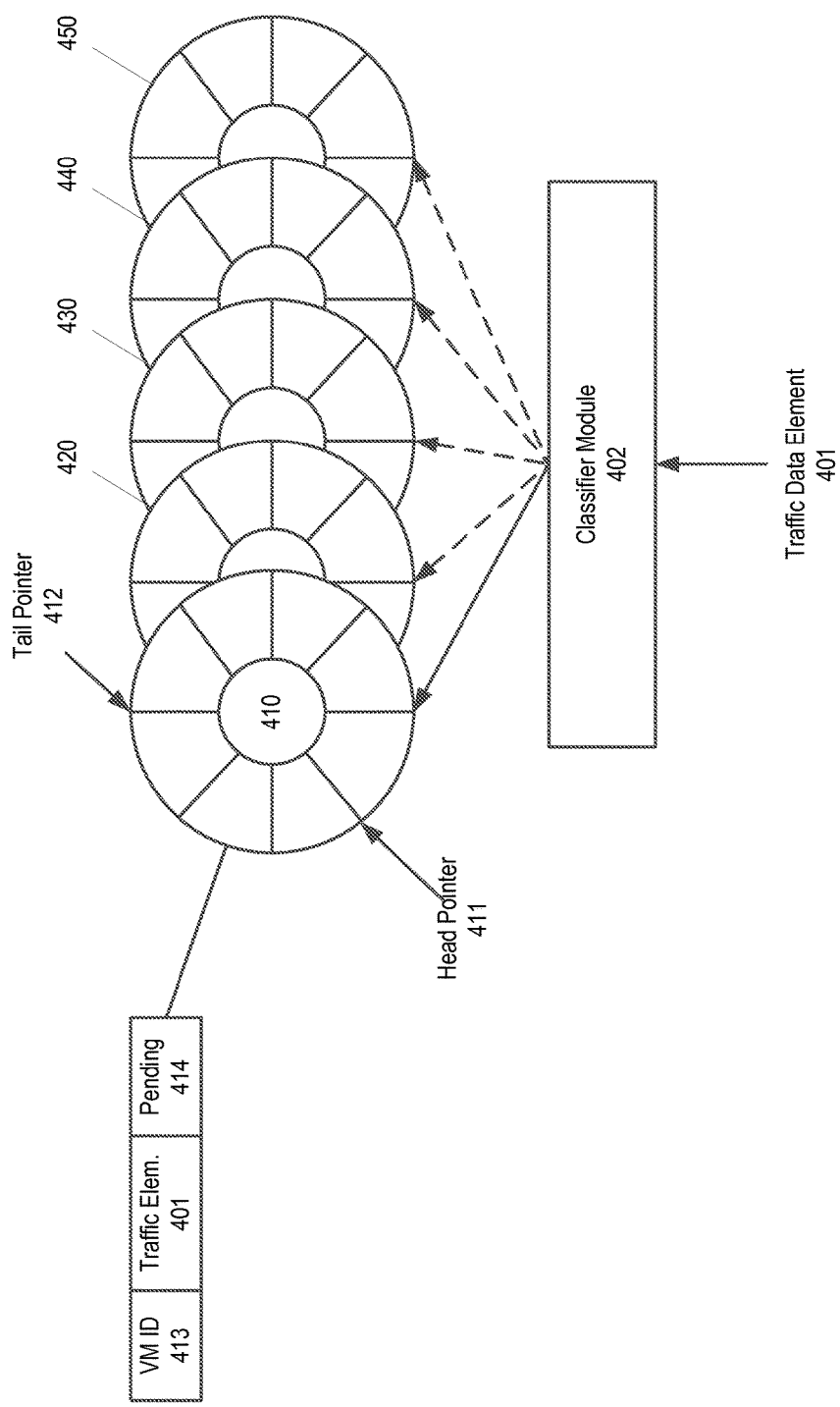
FIG. 4 illustrates an example implementation of routing traffic to one of a plurality of circular buffers for logging.

In some embodiments, logging module 200 may also be operable to classify traffic data elements into one of a plurality of communication logging buffers 200(*a*), or to determine whether a traffic data element should be stored. FIG. 4 shows an example of a logging module comprising a classifier in accordance with some embodiments.

Figure 2:
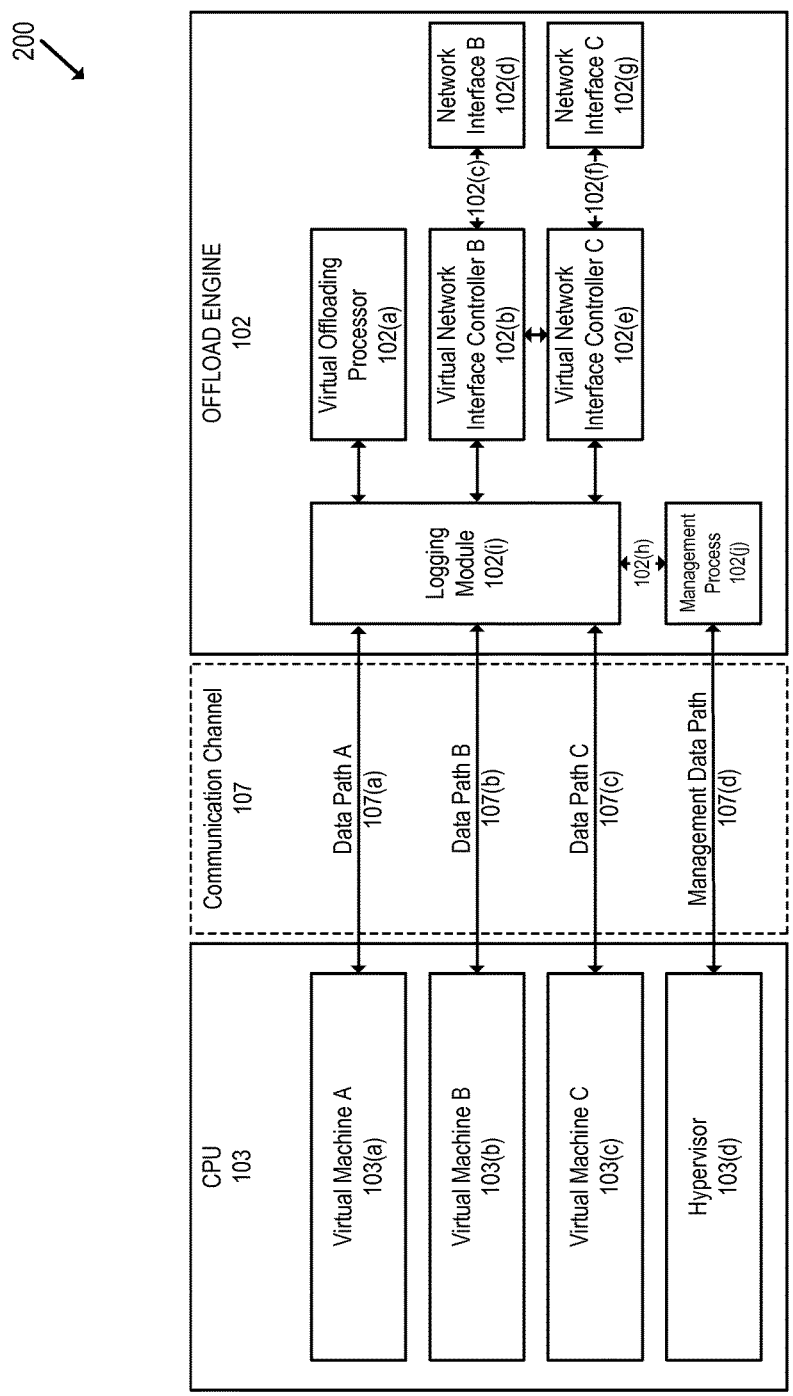
FIG. 2 shows a block diagram illustrating communication between a CPU and an offload engine according to some embodiments.

FIG. 2 shows a block diagram 200 illustrating communication between a CPU 103 and an offload engine 102 according to some embodiments.

As shown in FIG. 2, the CPU 103 may execute a plurality of processes, such as a virtual machines A-C 103(*a*)-103(*c*) and a hypervisor 103(*d*). In addition, the offload engine 102 may emulate a plurality of devices, such as virtual offloading processor 102(*a*), and virtual network interface cards 102(*b*) and 102(*e*). Offload engine 102 may also include a management process 102(*h*). Each of the above-described components of CPU 103 and offload engine 102 may communicate using data paths 107(*a*)-(*d*) over communication channel 107.

Virtual machine A 103(*a*) may be any suitable emulation of a computer system. Virtual machine A 103(*a*) may be in communication with a virtual offloading processor 102(*a*) via a data path A 107(*a*). Virtual offloading processor 102(*a*) may include one or more processing elements such as microprocessors. For example, virtual offloading processor 102(*a*) may include a general purpose graphical processing unit (GP-GPU), an application-specific instruction-set processor (ASIP), or another specialized processing element that may be better suited for certain tasks (e.g., secure billing and transaction processing) than CPU 103.

Virtual machine B 103(*b*) may also be any suitable emulation of a computer system. Virtual machine B 103(*b*) may be in communication with a virtual network interface controller (NIC) B 102(*b*) via data path B 107(*b*). Virtual NIC B 102(*b*) may be configured to perform network operations such as sending and receiving packets. Virtual NIC B 102(*b*) may be in communication with a network interface B 102(*d*) via an internal bus 102(*c*). Network interface B 102(*d*) may be any suitable interface to a computer network. In one example, network interface B 102(*d*) may be a physical Ethernet port. In another example, network interface B 102(*d*) may be a virtual network interface that shares the same physical Ethernet port with one or more other virtual network interfaces. Virtual machine C 103(*c*) may similarly be in communication with virtual NIC C 103(*e*) and network interface C 102(*g*).

In some embodiments, the logging module 102(*i*) may be used to store, configure, and log traffic associated with offload engine 102. As shown in FIG. 2, logging module 102(*i*) may receive communication traffic from each of data paths 107(*a*)-(*d*). Logging module 102(*i*) may then classify and log the received traffic (e.g., in one or more circular buffers). Elements of a logging module according to some embodiments are shown in FIG. 4.

The virtual machines 103(*a*)-(*c*) running on CPU 103 may be managed by hypervisor 103(*d*). Hypervisor 103(*d*) may, for example, be configured to create, start, monitor, stop, and delete virtual machines 103(*a*)-(*c*). In addition, hypervisor 103(*d*) may be configured to communicate with a management process 102(*g*) on offload engine 102 via a management data path 107(*d*). The management process 102(*g*) may be used to, for example, create or remove virtual devices such as devices 102(*a*)-102(*c*) and manage data logs at a logging module 102(*i*) via a logging interface 102(*h*). For example, in some embodiments, management data path 107(*d*) may be used by CPU 103 or another entity to retrieve logs generated using logging module 102(*i*). In some embodiments, management process 102(*g*) may employ access control restrictions or other security properties in order to safeguard access to logging module 102(*i*).

It should be noted that although certain virtual devices are shown as part of the offloading engine 102 of FIG. 2 (i.e., virtual offloading processor 102(*a*) and virtual network interface cards B and C 102(*b*) and 102(*e*)), embodiments may generally relate to any suitable virtual or physical I/O device. In addition, although in FIG. 2 virtual machines 103(*a*)-(*c*) and virtual devices 102(*a*), 102(*b*) and 102(*e*) have a one-to-one correspondence, in various embodiments a virtual machine may be associated with zero, one, or multiple virtual devices on an offload engine. Furthermore, although FIG. 2 is described with reference to a plurality of virtual machines running on CPU 103, it should be noted that in some embodiments CPU 103 may run a single, non-virtualized operating system.

Figure 3:
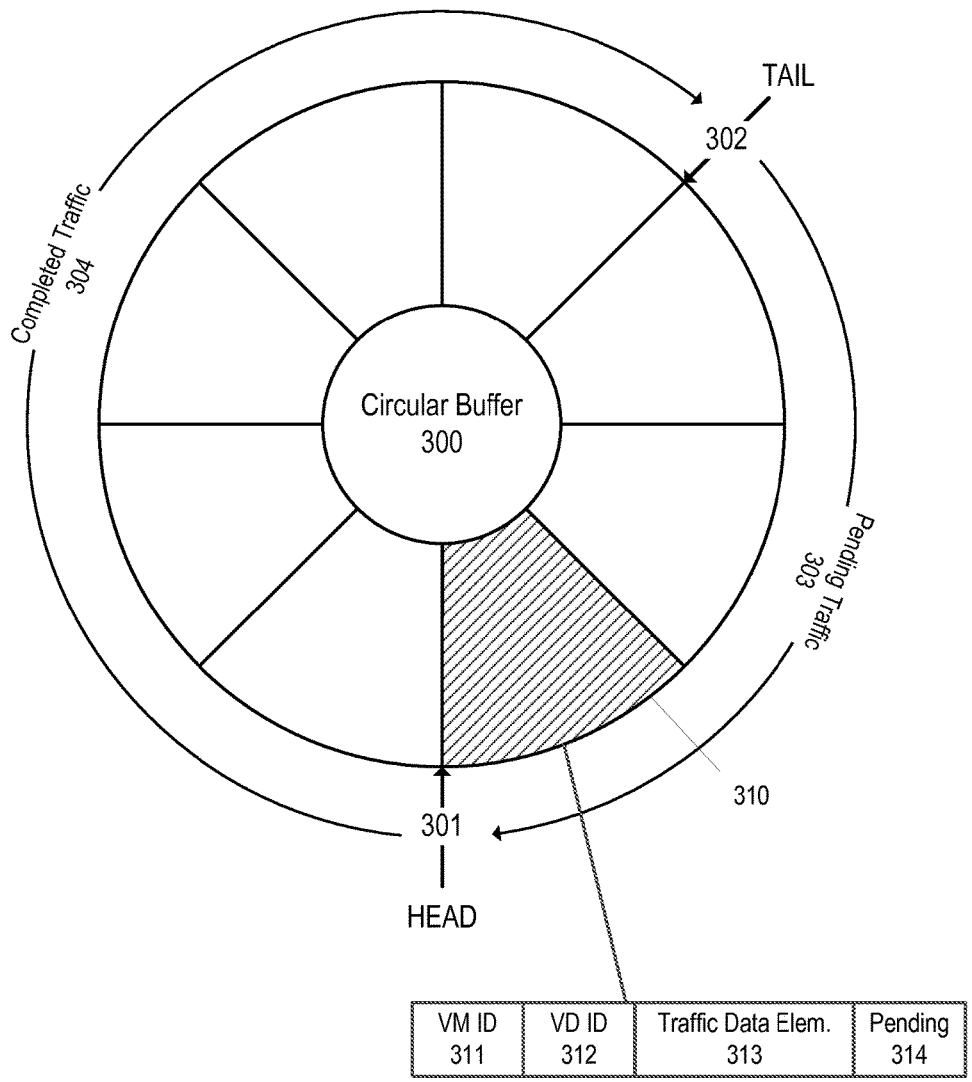
FIG. 3 shows a diagram of a circular buffer that may be used in some embodiments.

FIG. 3 shows a diagram of a circular buffer 300 that may be used in some embodiments. The circular buffer 300 may be stored in any suitable medium. For example, in some embodiments, circular buffer 300 may reside in a computer-readable memory, such as dynamic random access memory (DRAM), static random access memory (SRAM), a hard disk, a solid state drive (SSD), etc. Circular buffer 300 is depicted as a circle in FIG. 3, but it should be appreciated that the buffer's physical structure may be in other arrangements (e.g., an array, linked list, etc.).

Circular buffer 300 may include a plurality of buffer entries, such as entry 310. Each buffer entry may include, for example, a single traffic data element. A "traffic data element" may include any data or other information associated with communication traffic to, from, or inside an offload engine 102 (e.g., between virtual NIC B 102(*b*) and virtual NIC C 102(*e*)). Traffic data can include messages or other data passed along a communication medium such as communication channel 107. For example, if the communication medium is a PCI Express bus, the traffic data may include transaction layer packets sent across the bus. A traffic data element may be, for example, a single transaction layer packet. If the communication medium is an Ethernet network, the traffic data may include TCP or UDP packets sent across the network. A traffic data element may be, for example, a TCP/IP packet or a UDP packet. Traffic data elements may be of any suitable length. For example, the traffic data elements can be of fixed length (e.g., if there is a predefined packet size), or of variable length.

In various embodiments, the size of each buffer entry may be predetermined and fixed, or may be variable (e.g., it may depend on the size of the traffic data element stored in the entry). In addition to the traffic data element, a buffer entry may also include information such as a source or destination of the traffic data element, and an indication of whether the traffic data element is pending. For example, the buffer entry 310 includes a virtual machine ID 311, a virtual device ID 312, traffic data element 313, and a pending flag 314.

The virtual machine ID 311 may be any data suitable to identify a virtual machine associated with the traffic data element 313. For example, in one embodiment, offload engine 102 may emulate a plurality of virtual devices, each virtual device associated with a virtual machine running on CPU(s) 103. Thus, traffic data to offload engine 102 may be directed to any one of the plurality of virtual devices, and may originate from any one of the virtual machines. Analogously, traffic data originating from offload engine 102 may be directed from a virtual device to a virtual machine. Virtual machine ID 311 may be used to identify the virtual machine corresponding to the traffic data element. Similarly, virtual function ID 312 may be used to identify the virtual device or virtual function associated with the traffic data element.

Pending flag 314 may include any data suitable to provide an indication to the status of the traffic data element 313. In some embodiments, traffic data may be expected to be acknowledged, responded to, or otherwise processed. For example, if the traffic data corresponds to a network controller, the protocol implemented by the network controller may expect acknowledgement of received packets. While the packet remains unacknowledged, it may be considered pending. Once the packet is acknowledged, however, it may be considered completed. In some embodiments, the circular buffer may be configured to only store pending traffic data elements, or to overwrite non-pending traffic data elements in certain cases.

For example, as shown in FIG. 3, two pointers are maintained in relation to circular buffer 300: a head pointer 301, and a tail pointer 302. Each of pointers 301 and 302 may include any data suitable to identify positions in circular buffer 300. For example, pointers 301 and 302 may each identify a memory address corresponding to an entry in circular buffer 300. Head pointer 301 may indicate the position of the most recently added buffer entry in circular buffer 300. Conversely, tail pointer 301 may indicate the position of the oldest buffer entry in circular buffer 300.

As shown in FIG. 3, the buffer entries of circular buffer 300 are addressed in clockwise order. Thus, each time a new buffer entry is added to circular buffer 300, header pointer 301 is shifted once in the clockwise direction. Similarly, each time a buffer entry is removed from circular buffer 300, tail pointer 302 is shifted once in the clockwise direction. However, in other embodiments, the buffer entries of circular buffer 300 may be addressed in counter-clockwise order.

In some embodiments, circular buffer 300 may remove entries corresponding to traffic data elements that are no longer pending from circular buffer 300 to free entries for new traffic data elements. In such embodiments, the newest buffer entry may correspond to the most recent traffic data element, and the oldest buffer entry may correspond to the oldest currently pending traffic data element. Entries in circular buffer 300 from the tail pointer 302 to the head pointer 301 (in clockwise order) may therefore comprise pending traffic 303. In some embodiments, the range of pending buffer entries 303 may also be considered as the entries being "actively" stored by circular buffer. Conversely, entries in circular buffer 300 from head pointer 301 to tail pointer 302 (in clockwise order) may comprise completed traffic 304. In some embodiments, the entries 304 corresponding to the completed traffic may be considered "free"—that is, they may be overwritten if a new traffic data element is received.

FIG. 4 shows a diagram in which a traffic data element 401 is routed to one of a plurality of circular buffers 410-450 for logging. In some embodiments, FIG. 4 may be included in logging module 102(*i*) of FIG. 2. As shown in FIG. 4, the traffic data element 401 is first routed to a classifier module 402. Classifier module 402 may include any combination of software and hardware operable to determine a circular buffer to which the traffic data element 401 is to be routed. For example, in one embodiment, classifier module 402 may be implemented as part of management process 102(*g*) or logging module 102(*i*) of offload engine 102.

Traffic data element 401 may be determined from any suitable source. In some embodiments, traffic data element 401 may be any data element transmitted on communication channel 107 of host computing device 100. In other embodiments, traffic data element 401 may be a traffic data element transmitted on an internal bus, such as internal buses 102(c) and 102(f) of offload engine 102. In yet other embodiments, traffic data element 401 may be determined from a plurality of communication channels and/or buses. In addition, it should be noted that in some embodiments, traffic data may not be quantized into traffic data elements 401 before being received by classifier module 402. Rather, classifier module 402 may inspect data traffic and determine traffic data elements (e.g., packets), such as traffic data element 401, from the traffic data sent across one or more communication channels and/or buses.

In some embodiments, classifier module 402 may route the traffic data 401 according to the source of the traffic data 401. In other embodiments, classifier module 402 may route the traffic data elements according to the intended destination of the data traffic. In yet other embodiments, classifier module 402 may route the traffic data elements based on a virtual machine or a virtual device associated with the traffic data. In further embodiments, the traffic data elements can be routed using a combination of the above criteria and/or other criteria.

In addition, classifier module 402 may determine criteria to route traffic data element 401 in any suitable manner. For example, in some embodiments, classifier module 402 may perform a detailed analysis of traffic data element 401, such as a deep packet inspection, to determine routing criteria. In some embodiments, classifier module 402 may review a subset of traffic data element 401 to determine routing criteria. For example, if traffic data element 401 is a data packet (e.g., a TCP packet), the header of the packet may be inspected to route the packet to an appropriate circular buffer. In one example, the MAC address of a virtual device associated with the packet is used to route the packet to a circular buffer corresponding to the virtual device.

Once the traffic data element 401 is routed to an appropriate circular buffer, the circular buffer may add the traffic data element. For example, as shown in FIG. 4, traffic data element 401 may be routed to circular buffer 410. Circular buffer 410 may maintain a head pointer 411 and a tail pointer 412. A buffer entry for traffic data element 401 may then be created. For example, if each circular buffer is associated with a virtual device, the buffer entry may comprise a virtual machine ID 413 associated with the virtual device, the traffic data element 401, and a field 414 indicating whether the traffic data element 401 is pending or completed. Traffic data element 401 can then be added to circular buffer 410 at the head pointer, and the head pointer can then be incremented.

In some embodiments, classifier module 402, circular buffer 410, and/or another entity may be used to determine that a new traffic data element is an acknowledgement to or otherwise indicates the completion of traffic data element 401. For example, if traffic data element 401 is a TCP packet, classifier module 402 may determine that a new traffic data element corresponding to the acknowledgement of traffic data element 401 was received. Accordingly, once traffic data element 401 is determined to be completed, the status stored in pending field 414 can be updated to a completed state. If no buffer entries from the tail pointer to the updated entry are pending, the tail pointer can be incremented to the entry directly after the updated buffer entry. Thus, additional space in the circular buffer can be created for new traffic data elements.

Figure 5:
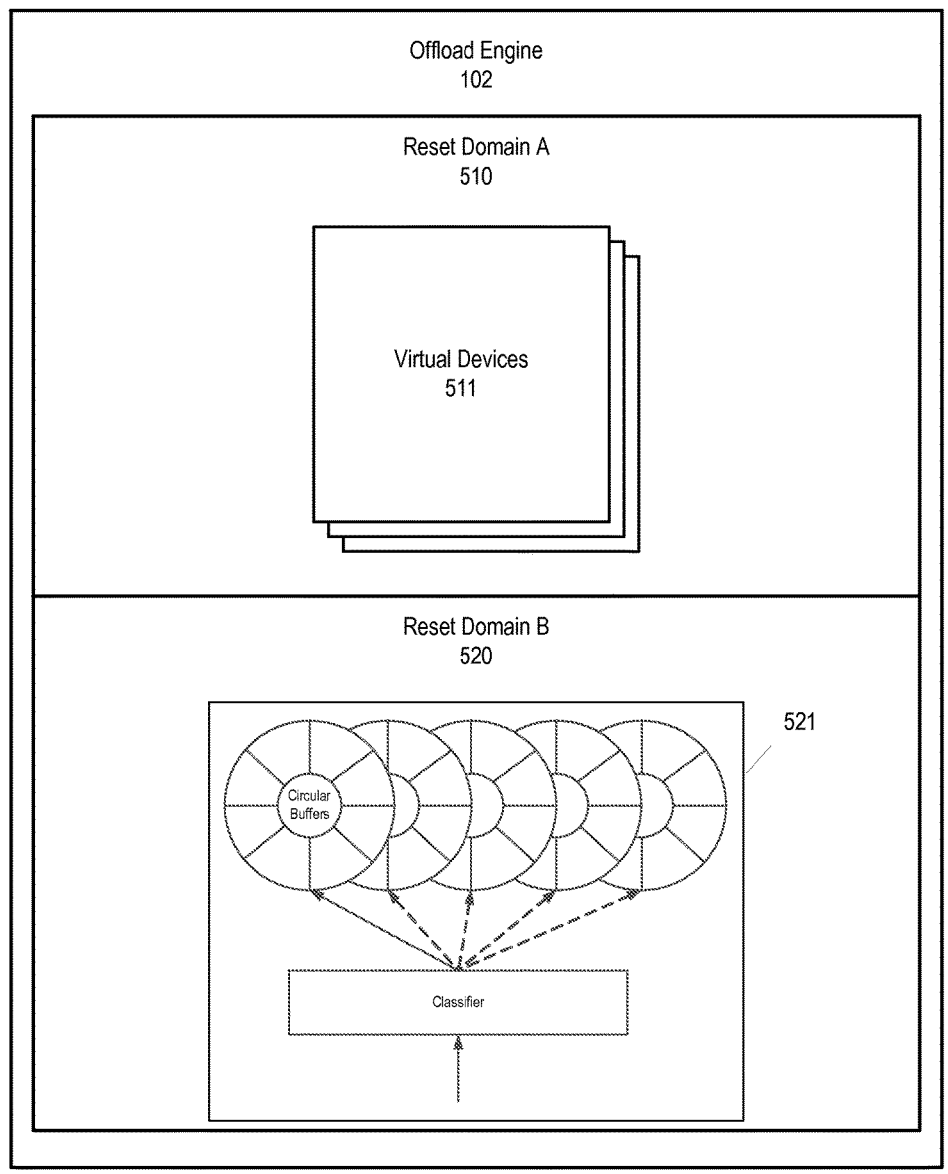
FIG. 5 shows an example of an offload engine comprising two reset domains.

FIG. 5 shows an example of an offload engine 102 comprising two reset domains: a reset domain A 510, and a reset domain B 520. As shown in FIG. 5, reset domain A comprises a plurality of virtual devices 511, and reset domain B comprises a logging module 521 comprising a plurality of circular buffers. Although not shown in FIG. 5, in some implementations, the management process 102(g) may also be implemented as part of reset domain B. The virtual devices 511 may be associated with and/or in communication with one or more virtual machines running on a CPU 103. The logging module 521 may store data traffic elements relating to the virtual devices 511.

Each reset domain may be configured such that control over reset operations is separate and independent from any other reset domain. For example, if a crash occurs in one of the virtual devices 511 of reset domain A that necessitates a reset, the reset will not cause the logging module 521 to reset, since the logging module 521 is in a different reset domain 520, and vice versa.

Having the virtual devices 511 and the logging module 521 on different reset domains can enable isolation between the domains. For example, if the circular buffers of logging module 521 are stored in DRAM, a reset operation may cause their contents to be lost. Thus, if both the memory of virtual devices 511 and the buffer entries of circular buffers of logging module 521 are stored in DRAM of an offload engine 102, and one of the virtual devices 511 causes the system to be reset, such as through a crash, the reset may clear buffer entries that may have been useful for debugging or troubleshooting the cause.

The reset domains A 510 and B 520 may be implemented in any suitable manner. For example, in one embodiment, a system on a chip (SoC) implementing the offload engine 102 may include a first memory domain used to implement the functionality of one or more virtual devices, and a second memory domain that includes one or more circular buffers. These memory domains may be implemented, for example, using static random access memory (SRAM) on the SoC.

In other embodiments, offload engine 102 may direct two reset wires to a memory controller for one or more external memory chips (e.g., DRAM chips). In response to a reset signal from the first reset wire, the memory controller may be configured to reset a first range of memory addresses corresponding to virtual devices 511. In response to a reset signal from the second reset wire, the memory controller may be configured to reset a second range of memory addresses associated with circular buffers of logging module 521. Thus, even if a crash necessitates the reset of virtual devices 511, the contents of the circular buffers may remain secure. However, it should be appreciated that other embodiments may utilize other methods of maintaining separate reset domains A 510 and B 520.

Furthermore, some embodiments may not have virtual devices 511 and circular buffers 521 in different reset domains. For example, in some embodiments, circular buffers 521 may be in entirely different power domains. In other embodiments, circular buffers 521 may be stored in low-voltage RAM, so that data may persist through a reset cycle. Further, in some embodiments, circular buffers 521 may be stored in a non-volatile memory, such as non-volatile random access memory (NVRAM), Flash, or EEPROM. In such embodiments, even if offload engine 102 is reset (e.g., in response to a crash of one of virtual devices 511), the traffic data elements stored in circular buffers 521 may remain accessible. In some embodiments, the logging module 521 and virtual devices 511 may also be in different power domains (i.e., a power-off or shutdown in one domain would not affect the power of other domains).

II. Methods

Figure 6:
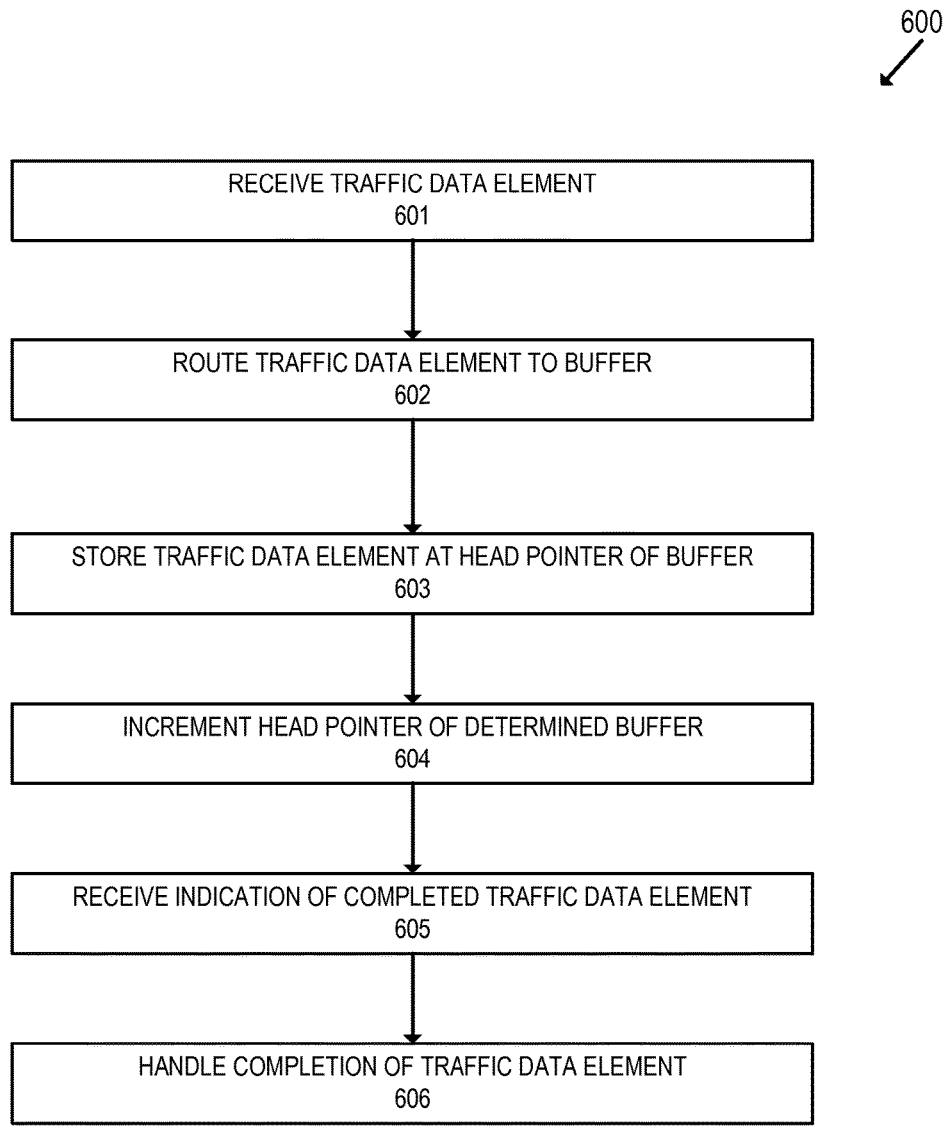
FIG. 6 shows an example method of logging data to a buffer.

FIG. 6 shows a method 600 of logging data to a buffer. In some embodiments, method 600 can be performed by a logging module 102(i) of an offload engine 102, a CPU 103, or any other suitable entity. Prior to method 600, traffic data sent on a communication channel, such as communication channel 107 may be monitored.

At step 601, a traffic data element is received. The traffic data element may be received in any suitable manner. For example, the traffic data element may be any data element transmitted on communication channel 107 of host computing device 100. In other embodiments, traffic data element 401 may be a traffic data element transmitted on an internal bus, such as internal buses 102(c) and 102(f) of offload engine 102. In yet other embodiments, traffic data element 401 may be determined from a plurality of communication channels and/or buses. In addition, in some embodiments, the traffic data element may be determined by inspecting and quantizing data traffic into discrete elements (e.g., packets).

At step 602, the traffic data element is routed to a buffer for logging. The buffer to route the traffic data element to may be determined in any suitable manner, such as by a classifier module 402 as described in relation to FIG. 4.

In some embodiments, the traffic data element may be routed to a buffer associated with a certain device. The device can be a virtual device, such as a virtual offloading processor 102(a), a virtual network interface controller 102(b) and 102(e), or a virtual storage area network adapter. The device can also be a physical device, such as a physical network interface controller, storage area network adapter, processor, etc. In some embodiments, each of one or more virtual and/or physical devices associated with offloading engine 102 may have a corresponding buffer maintained by offloading engine 102. If a traffic data element is associated with a device, then the traffic data element can be routed to a buffer corresponding to that device.

The device associated with a traffic data element may be determined by any suitable manner. For example, if the traffic data element is a packet or other message, the device associated with the traffic data element may be a source or destination of the traffic data element. In some embodiments, the device can be determined through a detailed analysis of the received traffic data element, such as a deep packet inspection, or through a more lightweight approach such as an inspection of the header of the traffic data element. In one example, if the traffic data element is a packet, and the packet includes the MAC address of a virtual device (either in the source or destination fields), the traffic data element is routed to a circular buffer corresponding to the virtual device.

However, it should be appreciated that in other embodiments, a traffic data element may be routed on the basis of other criteria, such as the source or destination of the traffic data element, a protocol associated with the traffic data element, metadata in the traffic data element, a content analysis of the traffic data element, or any other suitable criteria.

At step 603, the traffic data element is written at the head pointer of the determined buffer. Writing the traffic data element may comprise creating a buffer entry comprising the traffic data element and additional data, such as one or more of: a virtual machine identifier, a virtual device identifier, a timestamp, a status flag indicating whether the traffic data element is pending or completed, and a serial number for the entry. In some embodiments, each buffer entry may be of fixed length. In other embodiments, buffer entries may vary in length.

In some embodiments, a check for available space in the buffer may be performed before writing the traffic data element. In one embodiment, the check may comprise ensuring that incrementing the head pointer (e.g., as explained below with reference to step 604) does not move it past the tail pointer (i.e., ensuring that the new buffer entry does not overwrite existing pending buffer entries). In some embodiments, if this check fails, the data may be written to an external buffer.

At step 604, the head pointer of the incremented buffer is incremented. In some embodiments, the head pointer may be incremented by the size of the buffer entry. For example, if a buffer entry comprises a virtual machine ID (4 bytes), a virtual device ID (4 bytes), a traffic data element (e.g., a packet of 1500 bytes), and a status flag (1 byte), then the head pointer may be incremented by 4+4+1500+1=1509 bytes. In the case of a circular buffer, this increment operation can be done in modular arithmetic, so that an entry "wraps around" if it reaches the end of a memory space used to implement the buffer.

At step 605, an indication is received of completion of the traffic data element. Typically, the indication may be received some time (nanoseconds to hours or days) after step 604. Completion of the traffic data element may include any indication that the traffic data element has been processed, handled, acknowledged, or otherwise has a disposition. For example, if a traffic data element is a TCP or other networking packet, completion of the traffic data element may be determined when a packet from the destination of the traffic data element acknowledges receipt of the traffic data element. However, in some embodiments, the indication of completion may be caused not by any received data but rather by a condition, such as a predetermined amount of time. In other embodiments, a combination of received data and conditions may be used to determine when a traffic data element is no longer pending and is completed. For example, a traffic data element may be determined to be completed either if an acknowledgement packet is received or a predetermined time period (e.g., a timeout) has elapsed since receipt of the traffic data element.

At step 606, completion of the traffic data element is handled. In some embodiments, no action may be performed upon completion of the traffic data element. In other embodiments, once the indication that the traffic data element is completed has been received, a pending bit corresponding to the traffic data element in the buffer may be cleared. For example, in some embodiments, rather than storing the indication that the traffic data element is completed (e.g., a completion request in the case of a TLP, or an acknowledgement in the case of a TCP/IP packet) in a buffer, the pending bit in the buffer entry corresponding to the completed traffic data element can be updated to indicate that the traffic data element is completed.

In some embodiments, at step 606 a tail pointer of the corresponding buffer is incremented. Incrementing the tail pointer of the buffer past the buffer entry corresponding to the traffic data element may essentially free that space for another entry. In some embodiments, the tail pointer may only be incremented if all entries preceding the entry corresponding to the traffic data element are also completed. This check may ensure that no currently pending traffic data elements in the buffer are overwritten (e.g., if the traffic data elements complete in an order different than the order they were received in). In some embodiments, a tail pointer may be incremented once the pending bit is cleared. In addition, it should be noted that in some embodiments, such as when an in order protocol is logged, there may not be a need to maintain a pending bit for traffic data elements. In some such embodiments, a pending bit may not be needed; rather, a tail pointer may optionally be incremented upon completion of the traffic data element.

Figure 7:
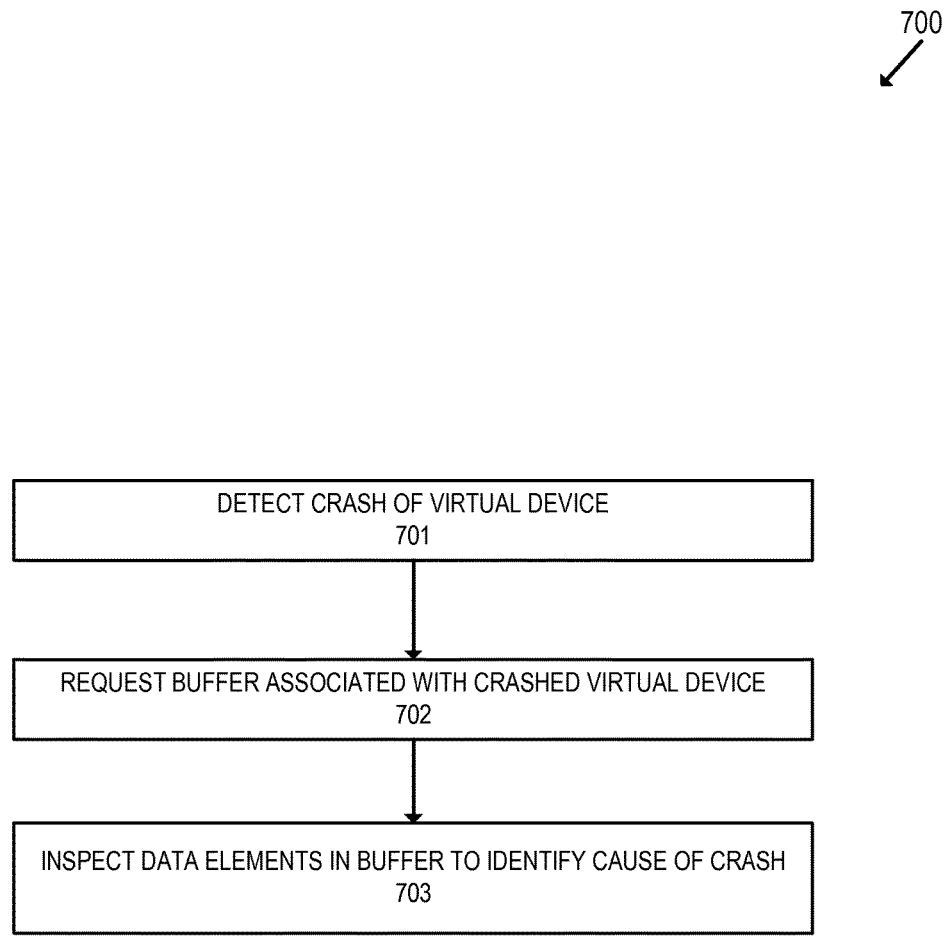
FIG. 7 shows an example method of using a buffer to identify the cause of a crash.

FIG. 7 shows a method 700 of using a buffer to identify the cause of a crash. In some embodiments, the buffer may comprise traffic data elements added to the buffer in accordance with method 600 as described above.

At step 701, a crash of a virtual device is detected. For example, a virtual machine A 103(a) communicating with a virtual offloading processor 102(a) on an offload engine 102 may determine that the processor 102(a) is unresponsive. If the crash is severe, the offload engine 102 may need to be restarted.

At step 702, a buffer associated with the crashed virtual device is requested. For example, in some embodiments, a developer of the virtual device may initiate the request using CPU 103. The requested buffer may include all traffic data elements that were pending or completed at the time of the crash.

At step 703, the traffic data elements in the buffer are inspected to identify the cause of the crash. For example, the traffic data elements can be resent to the virtual device one at a time to attempt to reproduce the crash. Also, the timestamps of traffic data elements may be inspected to better understand the timing of I/O device activity.

In addition, it should be noted that the buffers described herein may be used for situations other than analyzing crashes. For example, in embodiments, the buffers may be used generally to debug problems in an I/O device, or more generally to improve visibility into the operation of an I/O device.

III. Computer Apparatus

Figure 8:
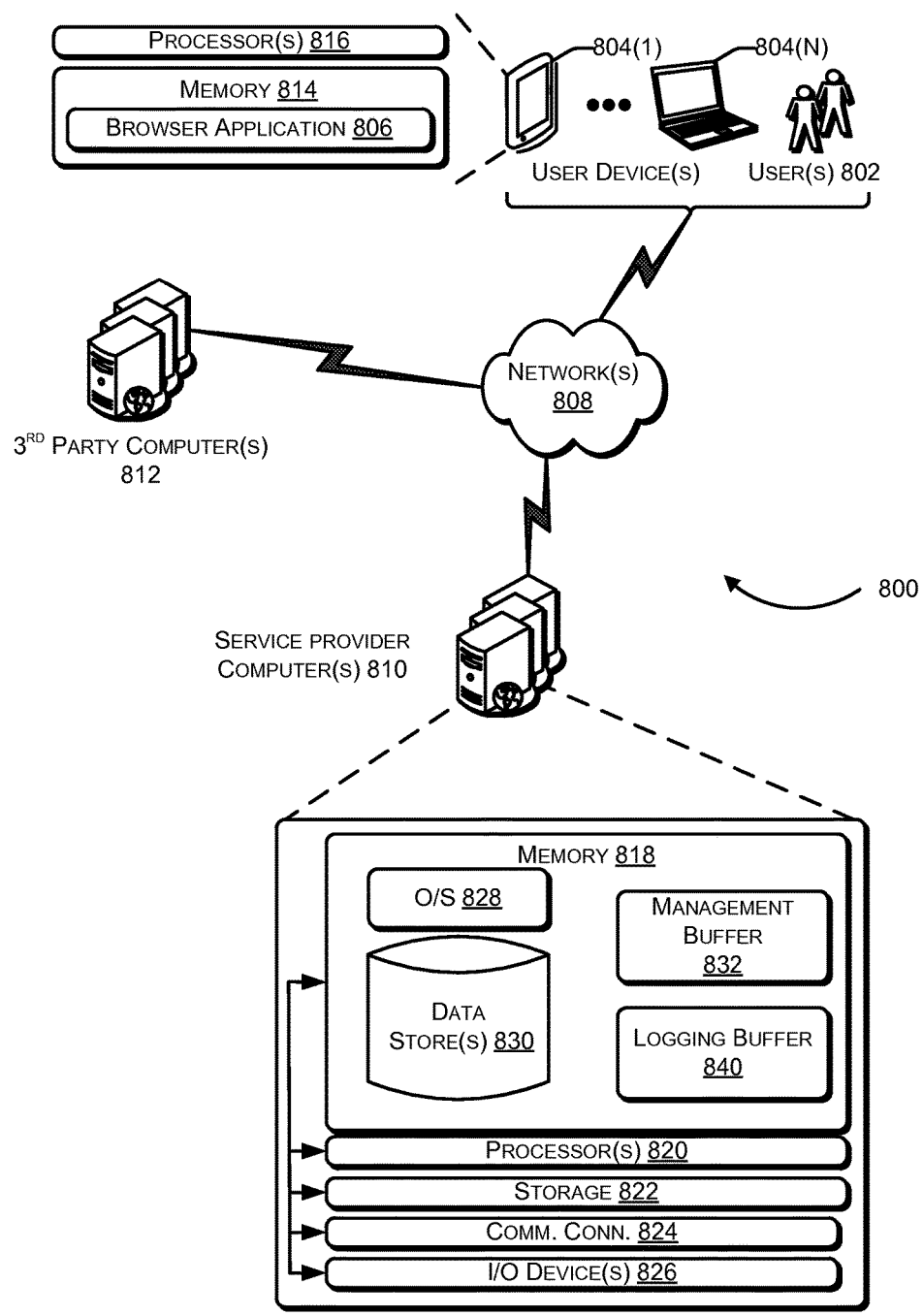
FIG. 8 shows an example architecture for features and systems described herein that includes one or more service provider computers and/or a user device connected via one or more networks, according to at least one exemplary embodiment.

FIG. 8 illustrates an exemplary architecture for features and systems described herein that includes one or more service provider computers and/or a user device connected via one or more networks, according to at least one exemplary embodiment. The devices discussed in FIGS. 1-13, may use one or more components of the computing devices described in FIG. 8 or may represent one or more computing devices described in FIG. 8. In architecture 800, one or more users 802 may utilize user computing devices 804(1)-(N) (collectively, user devices 804) to access application 806 (e.g., a web browser or mobile device application), via one or more networks 808. In some aspects, application 806 may be hosted, managed and/or provided by a computing resources service or service provider. One or more service provider computers 810 may provide a native application which is configured to run on user devices 804 which user(s) 802 may interact with. Service provider computer(s) 810 may, in some examples, provide computing resources such as, but not limited to, client entities, low latency data storage, durable data storage, data access, management, virtualization, cloud-based software solutions, electronic content performance management, etc. Service provider computer(s) 810 may also be operable to provide web hosting, computer application development and/or implementation platforms, combinations of the foregoing or the like to user(s) 802. Service provider computer(s) 810, in some examples, may communicate with one or more third party computers 812.

In some examples, network(s) 808 may include any one or a combination of many different types of networks, such as cable networks, the Internet, wireless networks, cellular networks and other private and/or public networks. While the illustrated example represents user(s) 802 accessing application 806 over network(s) 808, the described techniques may equally apply in instances where user(s) 802 interact with service provider computer(s) 810 via user device(s) 804 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 806 may allow user(s) 802 to interact with service provider computer(s) 810 such as to access web content (e.g., web pages, music, video, etc.). Service provider computer(s) 810, perhaps arranged in a cluster of servers or as a server farm, may host application 806 and/or cloud-based software services. Other server architectures may also be used to host application 806. Application 806 may be capable of handling requests from many users 802 and serving, in response, various item web pages. Application 806 can provide any type of website that supports user interaction, including social networking sites, online retailers, informational sites, blog sites, search engine sites, news and entertainment sites and so forth. As discussed above, the described techniques can similarly be implemented outside of application 806, such as with other applications running on user device(s) 804.

User device(s) 804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 804 may be in communication with service provider computer(s) 810 via network(s) 808, or via other network connections. Additionally, user device(s) 804 may be part of the distributed system managed by, controlled by or otherwise part of service provider computer(s) 810 (e.g., a console device integrated with service provider computers 810).

In one illustrative configuration, user device(s) 804 may include at least one memory 1414 and one or more processing units (or processor(s)) 816. Processor(s) 816 may be implemented as appropriate in hardware, computer-executable instructions, firmware, or combinations thereof. Computer-executable instruction or firmware implementations of processor(s) 816 may include computer-executable or machine-executable instructions written in any suitable programming language to perform the various functions described. User device(s) 804 may also include geo-location devices (e.g., a global positioning system (GPS) device or the like) for providing and/or recording geographic location information associated with user device(s) 804.

Memory 1414 may store program instructions that are loadable and executable on processor(s) 816, as well as data generated during the execution of these programs. Depending on the configuration and type of user device(s) 804, memory 1414 may be volatile (such as random access memory (RAM)) and/or non-volatile (such as read-only memory (ROM), flash memory, etc.). User device(s) 804 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1414 may include multiple different types of memory, such as static random access memory (SRAM), dynamic random access memory (DRAM), or ROM.

Turning to the contents of memory 1414 in more detail, memory 1414 may include an operating system and one or more application programs or services for implementing the features disclosed herein including at least a user provided input element or electronic service web page, such as via browser application 806 or dedicated applications (e.g., smart phone applications, tablet applications, etc.). Browser application 806 may be configured to receive, store and/or display a website or other interface for interacting with service provider computer(s) 810. Additionally, memory 1414 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 804.

In some aspects, service provider computer(s) 810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 810 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 810 may be in communication with user device(s) 804 and/or other service providers via network(s) 808, or via other network connections. Service provider computer(s) 810 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 810 may include at least one memory 818 and one or more processing units (or processor(s)) 820. Processor(s) 820 may be implemented as appropriate in hardware, computer-executable instructions, firmware or combinations thereof. Computer-executable instruction or firmware implementations of processor(s) 820 may include computer-executable or machine-executable instructions written in any suitable programming language to perform the various functions described.

In some instances, hardware processor(s) 820 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 818 may store program instructions that are loadable and executable on processor(s) 820, as well as data generated during the execution of these programs. Depending on the configuration and type of service provider computer(s) 810, memory 818 may be volatile (such as RAM) and/or non-volatile (such as ROM, flash memory, etc.).

Service provider computer(s) 810 or servers may also include additional storage 822, which may include removable storage and/or non-removable storage. The additional storage 822 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 818 may include multiple different types of memory, such as SRAM, DRAM, or ROM.

Memory 818, the additional storage 822, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 818 and the additional storage 822 are all examples of computer storage media. Additional types of computer storage media that may be present in service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 810. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 810 may also contain communications connection(s) 824 that allow service provider computer(s) 810 to communicate with a stored database, another computing device or server, user terminals and/or other devices on network(s) 808. Service provider computer(s) 810 may also include I/O device(s) 826, such as a keyboard, a mouse, a pen, a voice input device, a touch input device, a display, speakers, a printer and the like.

Memory 818 may include an operating system 828, one or more data stores 830 and/or one or more application programs or services for implementing the features disclosed herein, including a management buffer 832 and a logging buffer 840. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

Figure 9:
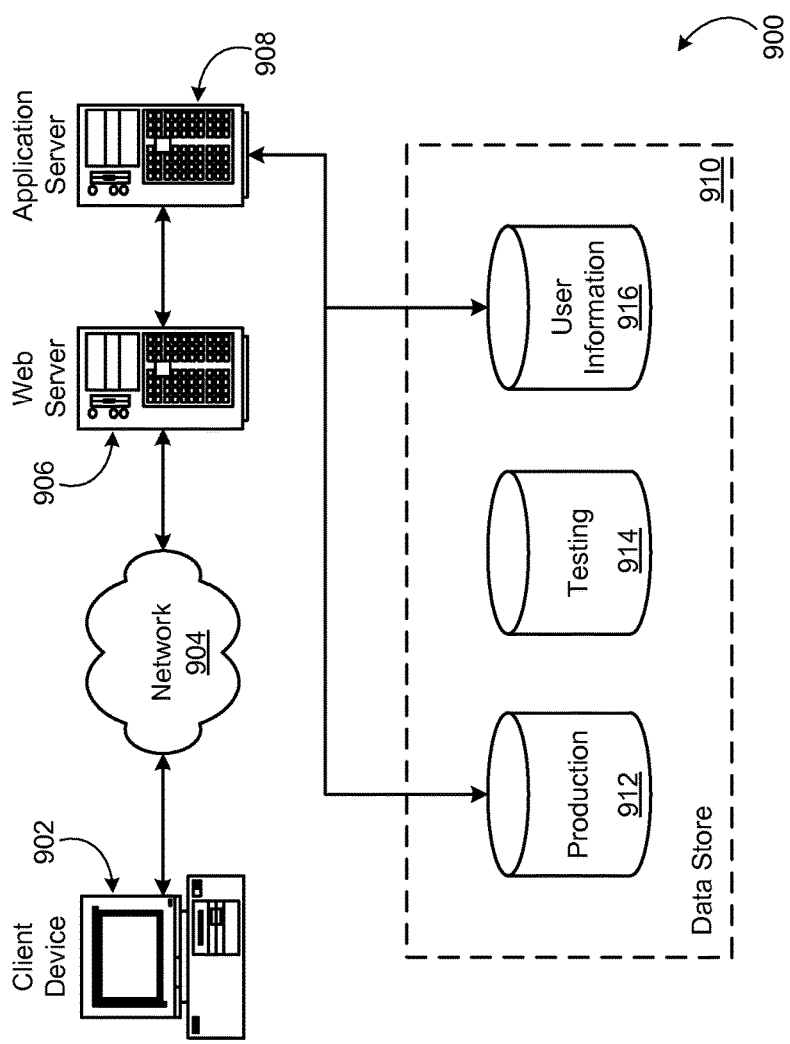
FIG. 9 shows an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computing device comprising:
   a processor comprising one or more processing cores, wherein each processing core is configured to execute a respective plurality of computer executable instructions;
   an offload engine emulating a plurality of virtual devices, wherein: the offload engine includes a first memory domain and a second memory domain;
   the first memory domain is used by a virtual device of the plurality of virtual devices to perform a pre-determined function;
   the second memory domain includes a plurality of circular buffers, wherein a circular buffer of the plurality of circular buffers is configured to store a traffic data element associated with the pre-determined function, and wherein the circular buffer is associated with the virtual device;
   the traffic data element is exchanged between the processor and the virtual device; and
   the first memory domain and the second memory domain are in different reset domains; and
   a communication channel between the processor and the offload engine, wherein the communication channel is operable to transmit the traffic data element, wherein the processor is further configured to:
   detect an event at the offload engine, wherein the event causes operation data of the pre-determined function stored in the first memory domain to become inaccessible to the processor; and
      based on detecting the event, acquire the traffic data element from the plurality of circular buffers.

2. The computing device of claim 1, wherein each buffer of the plurality of circular buffers stores traffic data elements associated with a respective virtual device of the plurality of virtual devices.

3. The computing device of claim 1, wherein the offload engine comprises a classifier module operable to route traffic data elements to a particular buffer in the plurality of circular buffers.

4. The computing device of claim 1, wherein the traffic data element is a transaction layer packet (TLP), and wherein the communication channel is a PCI Express bus.

5. The computing device of claim 1, wherein each of the plurality of circular buffers comprises a head pointer and a tail pointer, wherein the head pointer of a given circular buffer indicates a position of a most recent traffic data element in the given circular buffer, and wherein the tail pointer of the given circular buffer indicates a position of an oldest pending traffic data element in the given circular buffer.

6. The computing device of claim 1, wherein each of the plurality of circular buffers comprises a head pointer and a pending bit, wherein the head pointer of a given circular buffer indicates a position of a most recent traffic data element in the given circular buffer, and wherein the pending bit indicates whether a function associated with a traffic data element in the given circular buffer is pending or completed.

7. A computing device comprising:
   a processor comprising one or more processing cores, wherein each processing core is configured to execute a respective plurality of computer executable instructions;
   an I/O device, wherein the I/O device includes a first buffer for providing a communication function between the I/O device and the processor, and a second buffer for logging a status of the communication function, wherein logging the status of the communication function comprises logging traffic data associated with the communication function; and
   a communication channel between the I/O device and the processor for transmitting the traffic data,
   wherein the processor is further configured to: detect an event associated with the communication function, wherein the event causes operation data of the communication function stored in the first buffer to become inaccessible to the processor; and
      based on detecting the event, acquire at least a part of the traffic data from the second buffer.

8. The computing device of claim 7, wherein the traffic data comprises a plurality of traffic data elements, wherein the traffic data elements are logged by the second buffer.

9. The computing device of claim 8, wherein each processing core is configured to execute a respective plurality of virtual machines, wherein each of the traffic data elements logged by the second buffer is associated with a respective virtual machine identifier corresponding to a particular virtual machine in the respective plurality of virtual machines.

10. The computing device of claim 8, wherein the communication channel is a PCI Express bus, and wherein the traffic data elements are transaction layer packets.

11. The computing device of claim 8, wherein the communication channel is a communication network, and wherein the traffic data elements are Ethernet packets.

12. The computing device of claim 8, wherein the first buffer operates in a first reset domain, wherein the second buffer operates in a second reset domain, wherein the first reset domain and the second reset domain are independent of each other.

13. The computing device of claim 8, wherein the I/O device and the first buffer operate in a first power domain, wherein the second buffer operates in a second power domain, wherein the first power domain and the second power domain are independent of each other.

14. The computing device of claim 8, wherein the I/O device comprises a classifier module operable to determine whether to store a particular traffic data element in the second buffer.

15. The computing device of claim 8, wherein the second buffer is one of a plurality of buffers maintained for logging I/O device communication, and wherein the I/O device comprises a classifier module operable to route a particular traffic data element to a selected buffer in the plurality of buffers.

16. A computer-implemented method, comprising:
   receiving, by a processor, a traffic data element associated with an I/O device;
   providing, by the processor, the traffic data element to a first buffer to perform a communication function with the I/O device, and to a second buffer for logging traffic data element elements associated with the communication function;

storing, by the processor and in the second buffer, a buffer entry including the traffic data element;

determining whether an indication of completion of the communication function is received;

based on the determination that the indication is received, removing, by the processor, the buffer entry from the second buffer;

detecting an event that stops the communication function from completion; and based on the detection of the event, acquiring the traffic data element from the buffer entry.

17. The computer-implemented method of claim 16, wherein the second buffer is a circular buffer, wherein storing the buffer entry in the second buffer comprises:

storing, by the processor, the buffer entry at a head pointer of the second buffer; and incrementing, by the processor, the head pointer of the second buffer.

18. The computer-implemented method of claim 16, wherein the traffic data element is associated with a virtual device, and wherein the second buffer corresponds to the virtual device.

19. The computer-implemented method of claim 16, wherein the traffic data element is associated with a source or destination, and wherein the second buffer is determined from a plurality of buffers based on the source or destination of the traffic data element.

20. The computer-implemented method of claim 16, wherein the traffic data element comprises a header, and wherein the second buffer is determined from a plurality of buffers based on the header of the traffic data element.

21. The computer-implemented method of claim 16, wherein the traffic data element is a first traffic data element;

wherein the communication function is a second communication function;

wherein the buffer entry is a first buffer entry; and wherein the method further comprises: receiving, by the processor, a second traffic data element;

providing, by the processor, the second traffic data element to the first buffer to perform a second communication function with the I/O device, and to the second buffer for logging traffic data element associated with that communication function;

storing, by the processor and in the second buffer, a second buffer entry including the second traffic data element;

determining whether an indication of completion of the second communication function is received; and based on determining that the indication is received, removing, by the processor, the second buffer entry from the second buffer.

22. The computer-implemented method of claim 21, wherein removing the second buffer entry from the second buffer comprises:

incrementing, by the processor, a tail pointer of the second buffer in response to receiving the indication of completion of the second communication function based on a determination that no traffic data elements stored in the second buffer received prior to the second traffic data element are still pending.

\* \* \* \* \*